(12) United States Patent
McGuire et al.

(10) Patent No.: US 12,545,806 B2
(45) Date of Patent: Feb. 10, 2026

(54) ROOF SLOPING SYSTEM

(71) Applicant: Garland Industries, Inc., Independence, OH (US)

(72) Inventors: Jon McGuire, Cleveland, OH (US); Julie A. Geyer, Cleveland, OH (US); Jason D. Smith, Cleveland, OH (US); Matthew McDermott, Cleveland, OH (US); Melissa Rus, Cleveland, OH (US)

(73) Assignee: Garland Industries, Inc., Independence, OH (US)

( * ) Notice: Subject to any disclaimer, the term of this patent is extended or adjusted under 35 U.S.C. 154(b) by 37 days.

(21) Appl. No.: 18/768,671

(22) Filed: Jul. 10, 2024

(65) Prior Publication Data

US 2024/0360336 A1    Oct. 31, 2024

Related U.S. Application Data

(63) Continuation of application No. 17/368,132, filed on Jul. 6, 2021, now Pat. No. 12,139,633.

(60) Provisional application No. 63/048,814, filed on Jul. 7, 2020.

(51) Int. Cl.
| | |
|---|---|
| *E04D 13/04* | (2006.01) |
| *C09D 5/00* | (2006.01) |
| *C09D 7/65* | (2018.01) |
| *C09D 123/16* | (2006.01) |
| *C09D 175/04* | (2006.01) |
| *E04D 5/14* | (2006.01) |

(52) U.S. Cl.
CPC ............ *C09D 175/04* (2013.01); *C09D 5/002* (2013.01); *C09D 7/65* (2018.01); *C09D 123/16* (2013.01); *E04D 5/148* (2013.01); *E04D 13/04* (2013.01)

(58) Field of Classification Search
CPC .... C09D 123/16; C09D 175/04; C09D 5/002; C09D 7/65; E04D 5/148; E04D 13/04
USPC .......................................... 52/741.3, 746.11
See application file for complete search history.

(56) References Cited

U.S. PATENT DOCUMENTS

| | | | |
|---|---|---|---|
| 3,763,605 | A | 10/1973 | Freeman |
| 4,113,401 | A | 9/1978 | McDonald |
| 4,160,346 | A | 7/1979 | Kaufmann |
| 4,331,726 | A | 5/1982 | Cleary |
| 4,386,136 | A | 5/1983 | Kaufmann |
| 8,808,449 | B2 | 8/2014 | Jezequel et al. |
| 9,551,152 | B2 | 1/2017 | Feuer et al. |
| 10,934,212 | B2 | 3/2021 | Rice |
| 2010/0031593 | A1 | 2/2010 | Klose |
| 2013/0289168 | A1 | 10/2013 | Zember et al. |
| 2020/0148912 | A1 | 5/2020 | Arabi et al. |

FOREIGN PATENT DOCUMENTS

| | | |
|---|---|---|
| DE | 3432471 | 3/1986 |
| EP | 0540940 | 5/1993 |

*Primary Examiner* — James J Buckle, Jr.
(74) *Attorney, Agent, or Firm* — UB Greensfelder LLP; Brian E. Turung

(57) ABSTRACT

A sloping compound and method for using the sloping compound on building surfaces and/or ground surfaces to limit or prevent ponding of liquids on such surfaces. The sloping compound is formed of a binder and one or more different filler materials.

24 Claims, 7 Drawing Sheets

ROOF SLOPING SYSTEM

REFERENCED APPLICATIONS

The present disclosure is a continuation of U.S. patent application Ser. No. 17/368,132 filed Jul. 6, 2021, which in turn claims priority on United Stated Provisional Application Ser. No. 63/048,814 filed Jul. 7, 2020, which are fully incorporated herein.

FIELD OF DISCLOSURE

The present disclosure relates to a sloping compound and method for using the sloping compound on building surfaces and/or ground surfaces to build a slope to move ponded or flowing water toward a drain or scupper, or level a recessed or depressed area on a roof, thus limiting or preventing ponding of liquids on such surfaces. The sloping compound is formed of a binder and one or more different filler materials.

BACKGROUND OF THE DISCLOSURE

Due to settling, design constraints, or numerous other reasons, it is common that surfaces such a roof surfaces, sidewalks, and decks can develop recessed or unleveled regions that can accumulate liquids such a water. The accumulating of the liquid in such regions can be unsightly and result in the growth of mildew and mold, premature breakdown of the surface, leaking though the surface, structural damage to the roof or surface, etc.

Common roof sloping compounds consist of asphalt-based, tar-based, or concrete-based products. Such products are heavy compounds that can be difficult to transport and use on various types of surfaces. Also, asphalt-based or tar-based products can be solvent based and have irritating odors or shrink upon drying. Concrete-based products, for example, can be more rigid than the roof surface and are prone to crack due to differences in stress points over these surfaces. Furthermore, these compounds can be difficult to spread to create the desired slope or sloping on the applied surface and have the tendency to flow out before they set sufficiently.

SUMMARY OF THE DISCLOSURE

The present disclosure relates to a sloping compound and method for using the sloping compound on building surfaces and/or ground surfaces to limit or prevent ponding of liquids on such surfaces. The sloping compound is formulated to repair an existing surface. The substrate surfaces upon which the sloping compound can be used include, but are not limited to, roof surfaces, deck surfaces, portico surfaces, walkway surfaces, sidewalks, patio surfaces, plaza deck surfaces, pool deck surfaces, parking deck surfaces, walls, deck surfaces, gutters, landscaping, etc. The sloping compound can be used to level out the substrate surface to limit or prevent ponding on the substrate surface or to create a slope on the top of substrate surface to improve drainage on the substrate surface. The composition of the substrate surface is non-limiting (e.g., wood, metal, plastic, roof membrane, shingles, concrete, tile, composite wood, cementitious board, rocks, gravel, fiber board, asphalt, bricks, vinyl panels, fiberglass, bricks, stone, composite material, cellular PVC, polymers, etc.). Although the sloping compound was specifically formulated for use on sloped surfaces and/or to create a sloped surface, the sloping compound has additional uses such as, but not limited to, 1) filling void and/or cracks in vertical or horizontal surfaces (e.g., cracks in walls, crack or transition region between a driveway and garage floor, cracks in a sidewalk, cracks in a patio, etc.), 2) creating a floor surface (e.g., floor for a home gym, floor for a playground, patio floor, steps, sidewalk, small driveway, etc.), 3) being formed into customed shapes (e.g., bumpers, downspout block, pads for walking areas, pad to place under water facet, treads on various surfaces, boat treads, deck treads, stair treads, etc.), 3) bonding material to secure together landscape stone or bricks, 4) coatings about base of wood forms to reduce rotting of the wood (e.g., base of fence posts or other types of wood posts, base of wood deck supports, base of wood portico structure, base of railing posts, base of wood legs for outdoor playground equipment and systems, etc.), 5) bollard foundations to provide a flexible foundation to reduce damage to the bollard when struck by a vehicle, etc. The sloping compound, in all its applications, provides a water-resistance or waterproof layer, and also optionally provides a flexible and/or compressible layer that can be deformed when exposed to a certain amount of force, but which reforms to 50-100% (and all values and ranges therebetween) of its original shape after the force is removed or sufficiently reduced, and typically reforms to 80-100% of its original shape after the force is removed or sufficiently reduced.

In one non-limiting aspect of the present disclosure, there is provided a method for using the sloping compound. Generally, the steps for sloping and/or creating a slope on a substrate surface include: 1) optionally cleaning the top of the substrate surface to which the sloping compound is to be applied; 2) optionally priming the top of the substrate surface to which the sloping compound is to be applied; 3) providing the sloping compound and/or components of the sloping compound and optionally preparing the mixture of sloping compound if not already premixed; 4) applying and/or spreading the sloping compound on the top of the substrate surface to optionally reduce or eliminate recessed regions in the substrate surface and/or to optionally create a desired sloped surface on the top of the substrate surface; 5) allowing the sloping compound to at least partially cure, set, and/or dry; and 6) optionally applying a coating and/or membrane on one or more portions or all of the top surface of the sloping compound after the sloping compound has sufficiently set, dried, and/or cured.

In another non-limiting aspect of the present disclosure, the optional step of cleaning the top of the substrate surface to which the sloping compound is to be applied includes, but is not limited to: a) scraping/roughing the top surface of the substrate surface; b) applying a cleaning solution to the top surface of the substrate surface; c) removing debris, mold, mildew, soil, rocks, sand, vegetation, and/or other foreign objects from the top surface of the substrate surface; and/or d) washing the top surface of the substrate surface.

In another non-limiting aspect of the present disclosure, the optional step of priming the top of the substrate surface can be used to facilitate in the bonding of the sloping compound to the top surface of the substrate surface. If the optional step of cleaning the top of the surface of the substrate surface is first performed, the top surface of the substrate surface is generally allowed to first dry if one or more liquids were applied to the top surface of the substrate surface during the cleaning step; however, this is not required. The type of primers to be used is non-limiting. In one non-limiting embodiment, the primer is or includes the same formulation as the binder that is used in the sloping compound. Non-limiting primers include polyurethane primer/adhesive, elastomeric primer/adhesive, silicone primer/adhesive, asphalt emulsion primer/adhesive, bitumen based primer/adhesive, acrylic primer/adhesive, butyl resin primer/adhesive, epoxy primer/adhesive, alkyd primer/adhesive, fluoropolymer primer/adhesive, PMMA primer/adhesive, polyester primer/adhesive, silyl terminated polyether (STPE) primer/adhesive, polyurea primer/adhesive, PUMA primer/adhesive, SEBS primer/adhesive, and styrene-acrylic primer/adhesive. The coating thickness of the optional primer on the top surface of the substrate surface is generally 0.001-0.5 inches (and all values and ranges therebetween), and typically 0.01-0.25 inches. In one non-limiting embodiment, the primer (when used) is applied at at least about 10 sq·ft./gal., typically 10-200 sq·ft./gal. (and all values and ranges therebetween), more typically 40-200 sq·ft./gal., and still more typically 75-120 sq·ft./gal.

In another non-limiting aspect of the present disclosure, if the sloping compound is not provided in a premixed form, the filler material and binder can be supplied to the user to enable the user to mix together the binder and filler material to form the sloping compound. The components of the sloping compound can be simply mixed in a bucket and other type of container. The mixing can be performed by a use of a mixing bag, stirring stick, shovel, drill mixer, or other mixing implement.

In another non-limiting aspect of the present disclosure, during the step of applying and/or spreading the sloping compound on the top of the substrate surface, a user can merely shovel or pour portions of the sloping compound onto the area that requires sloping or formation of a sloped surface. The sloping compound can be simply spread by use of a shovel, trowel, rake, straight-edge, and the like. After the sloping compound has been properly spread onto the top of the substrate surface, the sloping compound can be optionally compressed or stamped down. Such compression or stamp down process can be performed by use of a trowel, or the like. Water can be optionally applied to the trowel or other stamping device to facilitate in the stamping and/or compressing of the sloping compound. After the sloping compound is applied to the top of the substrate surface and optionally compressed or stamped down, the top surface of the sloping compound can optionally be brushed to form a smoother and/or more polished top surface.

In another non-limiting aspect of the present disclosure, the optional step of applying a coating or membrane on one or more portions or all of the top surface of the sloping compound after the sloping compound can be performed if the porosity of the sloping compound after curing or setting is unacceptable for a particular application. After the sloping compound partially or fully cures or sets, the sloping compound may be porous to liquids. If the cured or set sloping compound is too porous, a coating and/or membrane can be applied to the top surface of the sloping compound to seal the top surface of the sloping compound. Non-limiting substrates that can be applied over the top surface of the sloping compound includes single-ply and multi-ply membranes (e.g., EPDM membranes, TPO membranes, PVC membranes, KEE membranes, modified bitumen membranes, elastomeric films, etc.) and/or a liquid sealing coating. When a membrane is applied over top surface of the sloping compound, an adhesive can optionally be applied between the membrane and sloping compound to secure the bottom surface of the membrane to the sloping compound. Non-limiting adhesives include single- or two-part polyurethane adhesives, 100% solids modified silane adhesives, hot asphalt, solvent-based polymer modified asphalt adhesives, water-based asphalt adhesives, solvent-based synthetic rubber contact adhesives, and water-based acrylic adhesives. The thickness of the adhesive (when used) is typically 1-250 mils (and all values and ranges therebetween). In one non-limiting example, the thickness of a polyurethane adhesive is at least 64 mils (e.g., at least 4 gal/100 sf). In another non-limiting example, the thickness of a water-based acrylic adhesive is at least 8 mils for a (0.5 gal/100 sf). In another non-limiting example, the thickness of a water-based acrylic adhesive is at least 16 mils (e.g., at least 1 gal/100 sf). In another non-limiting example, the thickness of a water-based acrylic adhesive is 35-40 mils (e.g., 2-3 gal/100 sf). In another non-limiting embodiment, the thickness of the membrane is at least about 2 mils and generally 2-500 mils (and all values and ranges therebetween). In another non-limiting embodiment, a liquid or non-cured or non-dried coating can be applied on the top surface of the sloping compound and/or on the top surface of the membrane. Such coat can be used to 1) form a water resistant or waterproof coating on the top surface of the sloping compound and/or on the top surface of the membrane, 2) form a UV protective coating on the top surface of the sloping compound and/or on the top surface of the membrane, 3) form a smooth surface on the top surface of the sloping compound and/or on the top surface of the membrane, and/or 4) form a gripping surface on the top surface of the sloping compound and/or on the top surface of the membrane. Non-limiting liquid or non-cured or non-dried coatings include mastic coatings, elastomeric coatings, silicone coatings, polyurethane coatings, polyurea coatings, epoxy coatings, reflective coatings, SEBS coatings, aluminized coatings, solvent-based asphalt coatings, water-based asphalt coatings, roof cements, acrylic coatings, trowel grade coatings (e.g., rubber patching compound, epoxy coatings, elastomeric acrylic coating, asphalt emulsion coating, etc.), etc. The thickness of the coating (when used) and when dried and/or cured is 1-250 mils (and all values and ranges therebetween). In one non-limiting example, the thickness of the coating is up to 100 mils, and typically 8-64 mils (e.g., 0.5-4 gal/100 sf). Prior to the complete drying or curing of the coating, minerals, rock, and/or roofing granules can be applied to the top surface of the coating. The average size of the minerals, rock, and/or roofing granules are generally 0.4-10 mm (and all values and ranges therebetween). In one non-limiting example, #11 size roofing granules can be used. The color of the minerals, rock, and/or roofing granules is non-limiting (e.g., white, black, red, gray, brown, etc.). The minerals, rock, and/or roofing granules can be from a natural source, a process source, or a manmade material. The minerals, rock, and/or roofing granules can be broadcast onto the coating to obtain 20-100% coverage (and all values and ranges therebetween) of the top surface of the coating, and typically 50-100% coverage of the top surface of the coating.

In another non-limiting aspect of the present disclosure, the sloping compound is partially or fully formed of binder and filler material. In one non-limiting embodiment, the binder includes 1-25 vol. % or wt. % (and all values and ranges therebetween) of the sloping compound, typically 2-10 vol. % or wt. % of the sloping compound, and more typically 4-8 vol. % or wt. % of the sloping compound. The binder can be formed of one or more types of binders. In one non-limiting formulation, the binder includes a 60-100 vol. % or wt. % of a primary binder (and all values and ranges therebetween) of the binder and 0-40 vol % or wt. % of a secondary binder (and all values and ranges therebetween), and typically the primary binder constitutes 80-100 vol. % of the binder. In another non-limiting embodiment, the filler material constitutes 80-99 vol. % or wt. % (and all values and ranges therebetween) of the sloping compound, typically 90-98 vol. % or wt. % of the sloping compound, and more typically 92-96 vol. % or wt. % of the sloping compound. In one non-limiting formulation, the filler material includes a primary filler and secondary filler, wherein the primary filler and secondary filler have different compositions. The primary filler and secondary filler constitute 60-100 vol. % (and all values and ranges therebetween) of the filler material, and typically the primary filler and secondary filler constitutes 80-100 vol. % of the filler material. In one non-limiting formulation, the volume percent ratio of the primary filler to the secondary filler (or the secondary and tertiary filler) is 1-6:1 (and all values and ranges therebetween), typically 2-5:1, and more typically 2.5-4:1.

In another non-limiting aspect of the present disclosure, the sloping compound is applied to a surface (e.g., roofing surface, ground surface, etc.) at a thickness of 0.2 mm to 10 inches (and all values and ranges therebetween), and typically 5 mm to 4 inches. When the sloping compound is used to form a slope, the average slope of the top surface of the sloping compound relative to the applied surface (e.g., roof surface, ground surface, etc.) to which the sloping compound is applied is 0.5-45° (and all values and ranges therebetween), and typically 0.5-30°.

Binder

In another non-limiting aspect of the present disclosure, the binder can be formed of or include one or more resins. Non-limiting examples of resins include epoxy, urethane, polyurethane, acrylic, styrene butadiene, silicone, vinylester, phenolic, polyester resin, fiberglass resin, etc. In one non-limiting embodiment, the binder is formed of 60-100% (and all values and ranges therebetween) of a binder that is formed of or includes a resin that is at least partially formed of epoxy resin, urethane resin, polyurethane resin, acrylic resin, styrene butadiene resin, silicone resin, vinylester resin, phenolic resin, polyester resin, and/or fiberglass resin.

In another non-limiting aspect of the present disclosure, the binder is or includes a polyurethane. The polyurethane can be at least partially formed by a) methylene diphenyl diisocyanate (MDI) mixed with one or more polyols, b) toluene diisocyanate (TDI) mixed with one or more polyols, or c) a mixture of toluene diisocyanate (TDI) and MDI that is mixed with one or more polyols.

In another non-limiting aspect of the present disclosure, the polyurethane is a moisture-curing polyurethane that includes one or more polyurethane pre-polymers and one or more primary polyol compounds. The one or more polyurethane pre-polymers include at least one diisocyanate compound. The diisocyanate compound can include aromatic, aliphatic and/or cycloaliphatic diisocyanates having molecular weights of up to about 500; however, higher molecular weights can be used. Non-limiting examples of suitable aromatic diisocyanates include, but are not limited to, isomers of diphenylmethane 4,4'-diisocyanate (MDI), toluylene diisocyanate (TDI), naphthalene 1,5-diisocyanate (NDI), naphthalene 1,4-diisocyanate (NDI), diphenylmethane 2,4'-diisocyanate and mixtures of 4,4'-diphenylmethane diisocyanate with the 2,4' isomer, xylylene diisocyanate (XDI), 4,4'-diphenyl-dimethylmethane diisocyanate, di- and tetraalkyl-diphenylmethane diisocyanates, 4,4'-dibenzyl diisocyanate, 1,3-phenylene diisocyanate and 1,4-phenylene diisocyanate. Non-limiting examples of cycloaliphatic diisocyanates include 4,4'-dicyclohexylmethane diisocyanate ($H_{12}$MDI), 1-isocyanatomethyl-3-isocyanato-1,5,5-trimethyl-cyclohexane (isophorone diisocyanate, IPDI), cyclohexane 1,4-diisocyanate, hydrogenated xylylene diisocyanate ($H_6$XDI), 1-methyl-2,4-diisocyanato-cyclohexane, m- or p-tetramethylxylene diisocyanate (m-TMXDI, pTMXDI) and dimer fatty acid diisocyanate. Non-limiting examples of aliphatic diisocyanates are tetramethoxybutane 1,4-diisocyanate, butane 1,4-diisocyanate, hexane 1,6-diisocyanate (HDI), 1,6-diisocyanato-2,2,4-trimethylhexane, 1,6-diisocyanato-2,4,4-trimethylhexane, lysine diisocyanate and 1,12-dodecane diisocyanate ($C_{12}$DI)y. Non-limiting examples of MDI that can be used are sold under the trade name RUBINATE by Huntsman, DESMODUR by Covestro, or PAPI, Lupranate M10, Lupranate M20S, and Lupranate M70R, and Lupranate M200 by BASF.

In another non-limiting embodiment, the one or more diisocyanate compounds include methylene diphenyl diisocyanate (MDI) and/or toluene diisocyanate (TDI). The MDI and/or TDI included in the polyurethane pre-polymer can be pure MDI and/or TDI, and/or one or more isomers of MDI and/or TDI. In one non-limiting aspect of this embodiment, the MDI and/or TDI constitute 40-100 wt. % (and all values and ranges therebetween) of the diisocyanate compounds in the polyurethane pre-polymer, typically the MDI and/or TDI constitute 50.01-100 wt. % of the diisocyanate compounds in the polyurethane pre-polymer, more typically the MDI and/or TDI constitute 60-100 wt. % of the diisocyanate compounds in the polyurethane pre-polymer, and more typically the MDI and/or TDI constitute 95-100 wt. % of the diisocyanate compounds in the polyurethane pre-polymer.

In another non-limiting aspect of the present disclosure, the one or more primary polyol compounds included in the polyurethane pre-polymer include, but are not limited to, a) polypropylene glycols or polybutylene glycols which can be used include di- and/or trifunctional polypropylene glycols with two or more hydroxyl groups per molecule in the molecular weight range from 400-20,000 (and all values and ranges therebetween); b) polytetramethylene glycols (polybutylene glycols, poly(oxytetramethylene) glycol, poly-THF), wherein the molecular weight range of the polytetramethylene glycols are from 600-6,000 (and all values and ranges therebetween); c) low molecular weight polyols, alkylene diols (e.g., butanediol, hexanediol, octanediol, decanediol, dodecanediol, etc.); and/or d) polyester-polyols such as the crystalline or partly crystalline polyester-polyols which can be prepared by condensation of di- or tricarboxylic acids (e.g., adipic acid, sebacic acid, glutaric acid, azelaic acid, suberic acid, undecanedioic acid, dodecandioic acid, 3,3-dimethylglutaric acid, terephthalic acid, isophthalic acid, hexahydrophthalic acid, polycaprolactone, etc.), dimer fatty acid with low molecular weight diols or triols (e.g., ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimer fatty alcohol, glycerol, trimethylolpropane, etc.); and/or c) hydroxyl functional polybutadiene. Non-limiting examples of polyols that can be used include polypropylene glycols (Diol) [e.g., VORANOL by Dow, ARCOL Polyol by Covestro, etc.]; propylene oxide adduct of glycerine (Triol) [e.g., PLURACOL by BASF, etc.], polyether polyols (Diol & Triol) [e.g., ARCOL Polyol by Covestro, ACCLAIM Polyol by Covestro, ULTRACEL by Covestro, etc.]; polypropylene oxide-based polyol (Diol) [e.g., MULTRANOL by Covestro, etc.]; hydroxyl functional polybutadiene [POLY BD by Cray Valley, KRASOL by Cray Valley, etc.]; 1,12-octadecanediol; 1,2,3-propanetriol; 1,2,6-hexanetriol; 1,2-ethanediol; 1,3-butanediol; 1,4-benzenediol; 1,9-nonanediol; 2,2,4,4-tetramethyl-1,3-cyclobutanediol; 2,2,4-trimethyl-1,3-pentanediol; 2,2-bis(hydroxymethyl)-1,3-propanediol; 2,2-diethyl-1,3-propanediol;

2,2-dimethyl-1,3-butanediol; 2,3-butanediol; 2,3-naphthalenediol; 2,4-hexadiyne-1,6-diol; 2,7-dimethyl-3,5-octadiyne-2,7-diol; 2-butyl-2-ethyl-1,3-propanediol; 2-ethyl-2-methyl-1,3-propanediol; 2-methyl-2-propyl-1,3-propanediol; 3-chloro-1,2-propanediol; 3-methyl-1,3-butanediol; 3-methyl-2,4-pentanediol; 9-octadecene-1,12-diol; actol 21-56 diol; actol 22-110 diol; actol 23-95 diol; actol 32-160 triol; actol 33-46 triol; butanediol; butanetriol; butenediol; butynediol; dimethyl octanediol; dimethylhexanediol; a hydroxyl terminated poly(oxyalkylene polyol (e.g., Acclaim 2220, Acclaim 4220, PPG-1000, PPG-2000, and PPG-4000); poly(oxy(methyl-1,2-ethanediyl), alpha-hydro-omega-(2-aminomethylethoxy)-, ether with 2-ethyl-2-(hydroxymethyl)-1,3-propanediol (3:1); polyoxypropylenediamine. The primary polyol compound is generally a single polyol or formed of two or more different polyols that have different molecular weights. When the primary polyol is formed of two or more different polyols, one of the primary polyols has a molecular weight of at least 2000, and at least one other primary polyols has a molecular weight of less than 2000.

In another non-limiting aspect of the present disclosure, the equivalent ratio of the at least one diisocyanate compound to the one or more primary polyol compounds in the polyurethane pre-polymer is about 1-12:1 (and all values and ranges therebetween), typically about 10:1, more typically about 8:1, still more typically about 6:1, yet more typically about 4:1, and even yet more typically about 2:1. An equivalent ratio of less than 1:1 means the polyol equivalence is in abundance over the diisocyanate (or blend of diisocyanates) and the product may not cure adequately. In one non-limiting aspect of this embodiment, the polyurethane pre-polymer includes at least about 5 wt. % of at least one diisocyanate compound and at least 40 wt. % of one or more primary polyol compounds. In another non-limiting aspect of this embodiment, the polyurethane pre-polymer includes about 5-60 wt. % (and all values and ranges therebetween) of at least one diisocyanate compound 40-95 wt. % (and all values and ranges therebetween) of one or more primary polyol compounds. In still another non-limiting aspect of this embodiment, the polyurethane pre-polymer includes about 12-50 wt. % of at least one diisocyanate compound and 50-88 wt. % of one or more primary polyol compounds. In yet another non-limiting aspect of this embodiment, the polyurethane pre-polymer includes about 15-40 wt. % of at least one diisocyanate compound and 60-85 wt. % of one or more primary polyol compounds. In still yet another non-limiting aspect of this embodiment, the polyurethane pre-polymer includes about 18-37 wt. % of at least one diisocyanate compound and 64-82 wt. % of one or more primary polyol compounds.

In another non-limiting aspect of the present disclosure, the polyurethane pre-polymer optionally includes one or more chain extenders. The chain extender (when used) is generally a low molecular weight hydroxyl and amine terminated compound that positively affects the polymer morphology of polyurethane fibers. In addition to the primary and secondary polyols, one could also use low or high molecular weight polyols to be chain extenders and/or crosslinkers to join the much larger polymer chains to form even longer polymers. Such chain extenders and/or crosslinkers can include, but are not limited to, propylene glycol, ethylene glycol, 1,3-butanediol, dipropylene glycol, castor oil, and the like. The amount of chain extenders present in the polyurethane pre-polymer (when used) can be at least about 0.5 wt. %, typically about 0.5-10 wt. % (and all values and ranges therebetween), more typically about 1-8 wt. %, even more typically about 1.5-6 wt. %, still more typically about 2-5 wt. %, and still yet more typically about 2.5-4 wt. %. The content of the one or more diisocyanate compounds in the polyurethane pre-polymer is greater than the content of the one or more chain extenders in the polyurethane pre-polymer. In still another non-limiting embodiment of the disclosure, the molecular weight of the chain extender is less than the molecular weight of any of the primary polyol compounds contained in the polyurethane pre-polymer. In one aspect of this embodiment, the molecular weight of the chain extender is about 50-1200 (and all values and ranges therebetween), typically about 60-1000, more typically about 60-600, and even more typically about 75-450. In yet another and/or alternative non-limiting embodiment of the disclosure, the weight ratio of the one or more diisocyanate compounds to one or more chain extenders in the polyurethane pre-polymer is about 1.5-20:1 (and all values and ranges therebetween), typically about 2-15:1, more typically about 3-10:1; and still more typically about 4-8:1.

In another non-limiting aspect of the present disclosure, the binder optionally includes one or more catalysts. The catalyst content in the binder (when used) is about 0-3 wt. % (and all values and ranges therebetween), and typically 0-2 wt. %. Non-limiting catalysts that can be used include, but are not limited to, dibutyltin dilaurate (DBTDL), 1,3,5-(tris(3-dimethylamino) propyl)-hexahydro-s-triazine,1,8-diazabicyclo [5,4,0]undecene-7 (DBU), 1,4-diazabicyclo [2,2,2]octane, tetramethylbutanediamine (TMBDA), benzyldimethylamine (BDMA), bis-(2-dimethylamino-ethyl) ether, dibutyltin dilaurate, dibutyltin oxide, dimethylcyclohexylamine (DMCHA), dimethylethanolamine (DMEA), dioctyltin mercaptide, N-ethylmorpholine, N-(3-dimethylaminopropyl)-N,N-diisopropanolamine, N'-(3-(dimethylamino) propyl)-N,N-dimethyl-1,3-propanediamine, N,N,N'-trimethyl-N'-hydroxyethyl-bis(aminoethyl) ether, pentamethyldiethylenetriamine (PMDETA), pentamethyldipropylenetriamine, phenylmercuric neodeconate, tin mercaptides, triethylamine (TEA), triethylenediamine (TEDA).

In another non-limiting aspect of the present disclosure, non-limiting formulations of the binder are as follows in weight percent:

| Formula A | |
|---|---|
| Diisocyanate and/or polyisocyanate compound | 5-40 wt. % |
| Primary polyol compound | 55-95 wt. % |
| Catalyst | 0.01-2 wt. % |
| Formula B | |
| Diisocyanate and/or polyisocyanate compound | 5-20 wt. % |
| Primary polyol compound | 65-95 wt. % |
| Chain extender | 0.5-10 wt. % |
| Catalyst | 0.01-2 wt. % |
| Formula C | |
| MDI | 25-50 wt. % |
| 2000 MW Polyol | 50-74.99 wt. % |
| DBTDL | 0.01-1.5 wt. % |
| Formula D | |
| MDI | 29-45 wt. % |
| 2000-10000 MW Polyol | 55-70.99 wt. % |
| DBTDL | 0.01-1 wt. % |
| Formula E | |
| MDI | 28-45 wt. % |
| 2000-10000 MW Polyol | 48-61.99 wt. % |
| 400-1500 MW (Triol) | 10-30 wt. % |

-continued

| | |
|---|---|
| DBTDL | 0.01-1 wt. % |

Formula F

| | |
|---|---|
| MDI | 28-45 wt. % |
| 2000-10000 MW Polyol | 52-70.49 wt. % |
| Low MW Polyol Chain Extender | 1.5-6 wt. % |
| DBTDL | 0.01-1 wt. % |

Filler Material

In another non-limiting aspect of the present disclosure, the filler material includes one or more of a rubber component, a polymer component, and/or a glass component. In one non-limiting embodiment, the filler material includes a rubber component as the primary filler and a polymer component, and/or other filler component as a secondary filler or optional tertiary filler.

Rubber Component

The rubber component (when used) includes, but is not limited, to EPDM, natural rubber (NR), styrene-butadiene rubber (SBR), NR/SBR blends, polychloroprene, polyisoprene (synthetic natural rubber), and/or tire rubber. The rubber component can be formed from a new and/or recycled source. The rubber component can be ground, cut, and/or formed to a desired shape (e.g., spherical beads, non-spherical beads, tubes, rods, ground particles, pellets, etc.) and/or size. The average size of the rubber component generally is about 0.1-20 mm (and all values and ranges therebetween), and typically 0.5-8 mm; however, other sizes can be used. The rubber component can be formed of one or more different types of materials. In one non-limiting embodiment, the rubber component includes recycled ground EPDM having an average size of 0.5-3 mm.

Polymer Component

The polymer component (when used) includes, but is not limited, to polystyrene, PP, PE, HDPE, LDPE, PET, PBT, polyester, polyurethane, and/or acrylic. The polymer component can be ground, cut, and/or formed to a desired shape (e.g., spherical beads, non-spherical beads, tubes, rods, ground particles, pellets, etc.) and/or size. The polymer component can be formed from a new and/or recycled source. The average size of the polymer component generally is about 0.1-20 mm (and all values and ranges therebetween), and typically 0.5-8 mm; however, other sizes can be used. The color of the polymer component is non-limiting (e.g., white, red, black, yellow, blue, etc.). The polymer component can have any shape and can be formed to be hollow, solid, or foam. The polymer component can be formed of one or more different types of materials. In one non-limiting embodiment, the polymer component includes polystyrene foam beads having average diameter of 0.5-4 mm. In another non-limiting embodiment, the polymer component is includes foam formed of polyurethane or latex. The polymer component filler is typically the secondary filler when the polymer component filler is used; however, this is not required.

Other Filler Component

The other filler component (when used) includes, but is not limited to, glass fibers, glass beads, glass microballoons, ceramic beads, ceramic microballoons, cork, metal, wood, kaolin clay, rock, cardboard, paper, leather, plant fibers, carbon fibers, carbon tubes, etc. The other filler component can be ground, cut, and/or formed to a desired shape (e.g., spherical beads, non-spherical beads, tubes, rods, pellets, etc.) and/or size. The average size of the other filler component generally is about 0.1-20 mm (and all values and ranges therebetween), and typically 0.5-8 mm; however, other sizes can be used. The other filler component can be formed of one or more different types of materials. The other filler component can be the secondary filler when a polymer component filler is not used or can be a tertiary filler when a polymer component filler is used.

In one non-limiting example, the filler material includes both a rubber component and a polymer component. The rubber component can be formed of one or more rubber materials. The polymer component can be formed of one or more polymer materials. The volume ratio of the total rubber component to the total polymer component is 1.1:1 to 10:1 (and all values and ranges therebetween), and typically 2:1-6:1, and more typically 3:1 to 5:1. In another non-limiting example, the filler material is or includes EPDM rubber and polystyrene beads. In another non-limiting example, the sloping compound includes a polyurethane binder, and a filler material that includes both a rubber component and a polymer component.

One non-limiting object of the present disclosure is to provide a method to level low-lying regions on a roof top substrate to inhibit or prevent ponding of water on said roof top substrate and/or to create a slope on the roof top substrate to facilitate in the drainage of water on said roof top substrate by use of a sloping compound.

Another non-limiting object of the present disclosure is to provide a method to create a sloped surface on a ground surface (e.g., area next to a wall or foundation, area next to a landscaped area, etc.) to inhibit or prevent ponding of water on or adjacent to the location of the applied sloping compound.

Another non-limiting object of the present disclosure is to provide a method to level low-lying regions on a roof top substrate to inhibit or prevent ponding of water on said roof top substrate and/or to create a slope on said roof top substrate to facilitate in the drainage of water on said roof top substrate by use of a sloping compound wherein the method comprises: a) providing a mixture of sloping compound, said sloping compound including a mixture of binder and filler material, said binder including one or more resins selected from the group consisting of epoxy resin, urethane resin, polyurethane resin, acrylic resin, styrene butadiene resin, silicone resin, vinylester resin, phenolic resin, polyester resin and fiberglass resin, said filler material including a rubber component and optionally a secondary filling having a different composition from said rubber component, said binder constitutes 1-20 vol. % of said sloping compound and said filler material constitutes 80-99 vol. % of the sloping compound; b) applying and/or spreading said sloping compound on a top surface of said roof top substrate to reduce or eliminate recessed regions in said top surface of said roof top substrate and/or to create a desired sloped surface on said top of said roof top substrate; and, c) allowing said sloping compound to partially or fully cure and set.

Another non-limiting object of the present disclosure is to provide a method to level low lying regions on a roof top substrate to inhibit or prevent ponding of water on said roof top substrate and/or to create a slope on said roof top substrate to facilitate in the drainage of water on said roof top substrate by use of a sloping compound wherein the method includes the step of allowing said sloping compound to partially or fully cure and set is achieved when said sloping compound is at least 50% cured or set within 0.5-4 hours.

Another non-limiting object of the present disclosure is to provide a method to create a sloped surface on a ground surface (e.g., area next to a wall or foundation, area next to a landscaped area, etc.) to inhibit or prevent ponding of water on or adjacent to the location of the applied sloping compound to facilitate in the drainage of water wherein the method comprises: a) providing a mixture of sloping compound, said sloping compound including a mixture of binder and filler material, said binder including one or more resins selected from the group consisting of epoxy resin, urethane resin, polyurethane resin, acrylic resin, styrene butadiene resin, silicone resin, vinylester resin, phenolic resin, polyester resin and fiberglass resin, said filler material including a rubber component and optionally a secondary filling having a different composition from said rubber component, said binder constitutes 1-20 vol. % of said sloping compound and said filler material constitutes 80-99 vol. % of the sloping compound; b) applying and/or spreading said sloping compound on a top surface of said ground surface to create a desired sloped surface on said top of said ground surface; and, c) allowing said sloping compound to partially or fully cure and set.

Another non-limiting object of the present disclosure is to provide a method to create a sloped surface on a ground surface (e.g., area next to a wall or foundation, area next to a landscaped area, etc.) to inhibit or prevent ponding of water on said ground surface to facilitate in the drainage of water on said ground surface by use of a sloping compound wherein the method includes the step of allowing said sloping compound to partially or fully cure and set is achieved when said sloping compound is at least 50% cured or set within 0.5-4 hours.

Another non-limiting object of the present disclosure is to provide a sloping compound that includes a binder and a filler component and wherein said binder includes a polyurethane material, said polyurethane material includes 5-40 wt. % diisocyanate and/or polyisocyanate compound, 55-95 wt. % of one or more polyols, 0-2 wt. % catalyst, said filler component includes a rubber component as the primary filler component and a secondary filler material that includes a polymer component, and wherein a volume ratio of said rubber component to said polymer component is 2:1 to 6:1.

Another non-limiting object of the present disclosure is to provide a method to level low-lying regions on a roof top substrate to inhibit or prevent ponding of water on said roof top substrate and/or to create a slope on said roof top substrate to facilitate in the drainage of water on said roof top substrate by use of a sloping compound wherein the method further includes the step of cleaning a region of said top surface of said roof top substrate to which the sloping compound is to be applied, said step of cleaning includes a) optionally scraping/roughing the top surface of the roof top substrate; b) applying a cleaning solution to the top surface of the roof top substrate; c) removing debris, mold, mildew, soil, rocks, sand, vegetation, and/or other foreign objects from the top surface of the roof top substrate; and/or d) washing (e.g., power washing, scrubbing, etc.) the top surface of the roof top substrate.

Another non-limiting object of the present disclosure is to provide a method to create a sloped surface on a ground surface (e.g., area next to a wall or foundation, area next to a landscaped area, etc.) to inhibit or prevent ponding of water on or adjacent to the location of the applied sloping compound to facilitate in the drainage of water wherein the method further includes the step of cleaning a region of said ground surface to which the sloping compound is to be applied, said step of cleaning includes a) optionally scraping/roughing the ground surface; b) applying a cleaning solution to the top surface of the roof top substrate; c) removing debris, mold, mildew, soil, rocks, sand, vegetation, and/or other foreign objects from the ground surface; and/or d) washing (e.g., power washing, scrubbing, etc.) the top surface of the ground surface.

Another non-limiting object of the present disclosure is to provide a method to level low-lying regions on a roof top substrate to inhibit or prevent ponding of water on said roof top substrate and/or to create a slope on said roof top substrate to facilitate in the drainage of water on said roof top substrate by use of a sloping compound wherein the method further includes the step of priming said top of said roof top substrate to which the sloping compound is to be applied, said step of priming facilitates in bonding of said sloping compound to said top surface of said roof top substrate.

Another non-limiting object of the present disclosure is to provide a method to create a sloped surface on a ground surface (e.g., area next to a wall or foundation, area next to a landscaped area, etc.) to inhibit or prevent ponding of water on or adjacent to the location of the applied sloping compound to facilitate in the drainage of water wherein the method further includes the step of priming said top of said roof top substrate to which the sloping compound is to be applied, said step of priming facilitates in bonding of said sloping compound to said top surface of said roof top substrate.

Another non-limiting object of the present disclosure is to provide a sloping compound and a primer and wherein the primer has a same formulation of said binder of said sloping compound.

Another non-limiting object of the present disclosure is to provide a method to level low-lying regions on a roof top substrate to inhibit or prevent ponding of water on said roof top substrate and/or to create a slope on said roof top substrate to facilitate in the drainage of water on said roof top substrate by use of a sloping compound wherein the method further includes the step of compressing said sloping compound with a compression device after said sloping compound has been applied to said top surface of said roof top substrate, said compression device being optionally wetted with water during use of said compression device.

Another non-limiting object of the present disclosure is to provide a method to create a sloped surface on a ground surface (e.g., area next to a wall or foundation, area next to a landscaped area, etc.) to inhibit or prevent ponding of water on or adjacent to the location of the applied sloping compound to facilitate in the drainage of water wherein the method further includes the step of compressing said sloping compound with a compression device after said sloping compound has been applied to said top surface of said ground surface, said compression device being optionally wetted with water during use of said compression device.

Another non-limiting object of the present disclosure is to provide a method to level low-lying regions on a roof top substrate to inhibit or prevent ponding of water on said roof top substrate and/or to create a slope on said roof top substrate to facilitate in the drainage of water on said roof top substrate by use of a sloping compound wherein the method further includes applying a coating and/or membrane on one or more portions or all of said top surface of said sloping compound after said sloping compound has at least partially cured or set, and optionally applying a coating on the top surface of a membrane if a membrane is applied to the top surface of the sloping compound, and wherein said coating and/or membrane forming a waterproof or water-resistant barrier on said top surface of said sloping compound.

Another non-limiting object of the present disclosure is to provide a method to create a sloped surface on a ground surface (e.g., area next to a wall or foundation, area next to a landscaped area, etc.) to inhibit or prevent ponding of water on or adjacent to the location of the applied sloping compound to facilitate in the drainage of water wherein the method further includes applying a coating and/or membrane on one or more portions or all of said top surface of said sloping compound after said sloping compound has at least partially cured or set, and optionally applying a coating on the top surface of a membrane if a membrane is applied to the top surface of the sloping compound, and wherein said coating and/or membrane forming a waterproof or water-resistant barrier on said top surface of said sloping compound.

Another non-limiting object of the present disclosure is to provide a sloping compound, wherein said sloping compound includes a mixture of binder and filler material, said binder includes one or more resins selected from the group consisting of epoxy resin, urethane resin, polyurethane resin, acrylic resin, styrene butadiene resin, silicone resin, vinylester resin, phenolic resin, polyester resin and fiberglass resin, said filler material includes a rubber component and a secondary filling has a different composition from said rubber component, said binder constitutes 1-20 vol. % of said sloping compound and said filler material constitutes 80-99 vol. % of the sloping compound.

Another non-limiting object of the present disclosure is to provide a sloping compound, wherein said sloping compound has a permeability to water after said binder has dried, cured and/or set of less than 0.25 inches of water per square foot per hour.

Another non-limiting object of the present disclosure is to provide a sloped faced foundation wall or retaining wall comprising a) a foundation wall or retaining wall extending at least partially upwardly from a ground surface, said foundation wall or retaining wall having an outer and inner surface; b) a sloping surface forming a downwardly sloping surface from said inner and/or outer surface of said foundation wall or retaining wall to an outer edge of said sloping surface, said sloping surface having a maximum sloped angle of less than 80°, said sloping surface positioned at or closely adjacent to said inner and/or outer surface of said foundation wall or retaining wall, said sloping surface at least partially formed of a sloping compound, said sloping compound includes a mixture of binder and filler material, said binder including one or more resins selected from the group consisting of epoxy resin, urethane resin, polyurethane resin, acrylic resin, styrene butadiene resin, silicone resin, vinyl ester resin, phenolic resin, polyester resin and fiberglass resin, said filler material including a rubber component and a secondary filler having a different composition from said rubber component, said binder constituting 1-20 vol. % of said sloping compound and said filler material constituting 80-99 vol. % of the sloping compound.

These and other objects and advantages will become apparent from the discussion of the distinction between the invention and the prior art and when considering the preferred embodiment shown in the accompanying drawings.

BRIEF DESCRIPTION OF THE DRAWINGS

Reference may now be made to the drawings, which illustrate various embodiments that the invention may take in physical form and in certain parts and arrangement of parts wherein.

DETAILED DESCRIPTION OF VARIOUS NON-EMBODIMENTS OF DISCLOSURE

Figure 1:
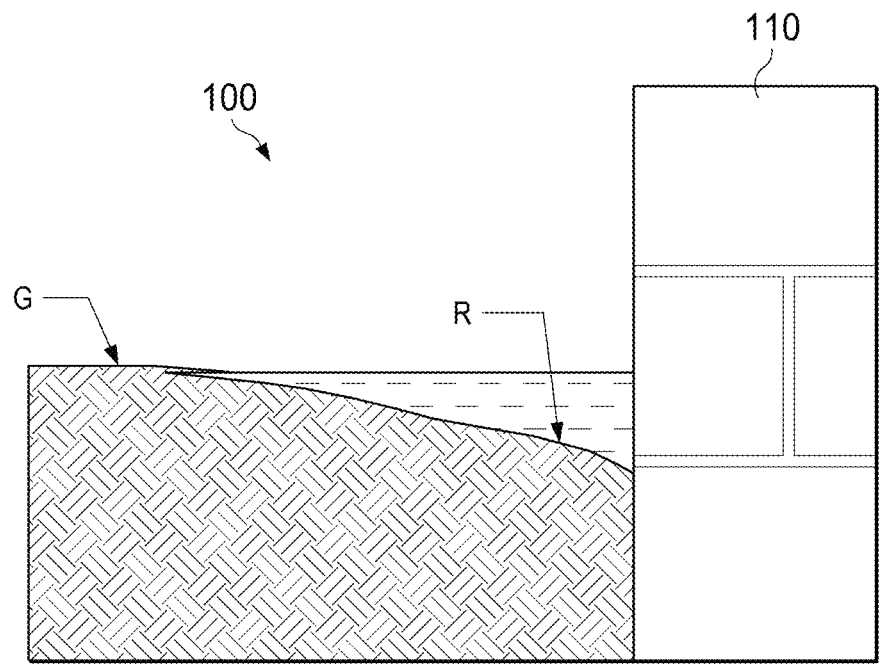
FIG. 1 is a side cross-section view of a wall and a recessed area adjacent to the wall.

A more complete understanding of the articles/devices, processes and components disclosed herein can be obtained by reference to the accompanying drawings. These figures are merely schematic representations based on convenience and the case of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

The present disclosure relates to a sloping compound and method for using the sloping compound on building surfaces and/or ground surfaces to limit or prevent ponding of liquids on such surfaces and/or to protect such surfaces form damage and/or erosion. The sloping compound is formed of a binder and one or more different filler materials.

In one non-limiting embodiment, the present disclosure pertains to a slope construction kit for a roof that includes a blend of shredded/ground rubber (e.g., ground EPDM rubber) and polystyrene beads that are mixed or can be mixed with a polyurethane binder. The shredded/ground rubber and polystyrene beads can be placed in a container (e.g., 4-10 gal. plastic bucket) and a separate container of polyurethane binder (e.g., 500-2000 g binder, etc.) When the sloping compound is to be formed, about 3-5 gallons of the shredded/ground rubber and polystyrene beads can be mixed with about 1000 g of polyurethane binder to form the sloping compound of the present disclosure. The sloping compound is a moldable/spreadable compound that allows a user to fashion sloped surfaces on a substrate, fill cracks, fill transition regions, form a durable floor surface, etc. The product remains fixed in the position in which it was molded and/or applied until it cures. Once the sloping compound cures, the sloping compound provides a durable surface that can be used to 1) level low regions of a substrate, 2) create a sloped top surface on a substrate (e.g., roof, gutter, foundation wall, retaining wall, pylons, fence posts, supports posts, landscaping, etc.) to divert rain runoff, snow melt water or drainage water toward a drain or scupper or gutter or region that is away from an undesired location, thus preventing standing water areas and its deleterious effects such as surface degradation, fungal, microbial, or algal growth, bacterial propagation, interior leaking, etc., and/or 3) form a durable surface (e.g., playground surface, workout surface, garage floor surface, pad underneath a facet, boat deck surface, dock surface, walking regions in a landscape area, outer coating on a bumper or rail, stair top coating, etc.).

Non-limiting formulations of the sloping compound are as follows (Vol. %):

Example A 70-98% Filler
2-30% Binder

Example B 50-85% Rubber component
10-40% Polymer component
2-25% Binder

Example C 60-75% Rubber component
15-30% Polymer component
4-10% Binder

Example D 68-73% Rubber component
20-25% Polymer component
5-8% Binder

The sloping compound is formulated to be spreadable on a top surface of a substrate prior to the curing and/or drying of the binder. When the binder is or includes polyurethane, the polymerization reaction of the polyurethane binder to achieve 50-100% (and all values and ranges therebetween) polymerization generally takes about 0.1-6 hours (and all values and ranges therebetween), and typically about 0.5-2 hours. The viscosity of the binder prior to beginning the curing process is about 1000-6000 cP at 25° C. (and all values and ranges therebetween), and typically 2000-5000 cP at 25° C.

In one specific embodiment, the sloping component is formed by combining a two-component filler material with un uncured polyurethane binder. The filler material includes a rubber component (e.g., recycled ground EPDM) and a polymer component (e.g., polystyrene foam beads) wherein the rubber component to polymer component volume ratio is 2-4:1. The filler material constitutes about 90-95 vol. % of the sloping component and the binder constitutes about 5-10 vol. % of the sloping component. The average particle size of the filler material is 0.5-8 mm.

In one specific non-limiting method for applying the sloping component to a roof top substrate to level low lying regions on the roof top substrate to inhibit or prevent ponding of water on the roof top substrate and/or to create a slope on the roof top substrate to facilitate in the drainage of water on the roof top substrate, the method includes:

1) Optionally cleaning all or a region of the top surface of roof top substrate to which the sloping compound is to be applied. The optional step of cleaning includes a) scraping/roughing the top surface of the roof top substrate, b) applying a cleaning solution to the top surface of the roof top substrate, c) removing debris, mold, mildew, soil, rocks, sand, vegetation, and/or other foreign objects from the top surface of the roof top substrate, and/or d) washing (e.g., power washing, scrubbing, etc.) the top surface of the roof top substrate.

2) Optionally priming the top of the roof top substrate to which the sloping compound is to be applied. The step of priming facilitates in the bonding of the sloping compound to the top surface of the roof top substrate. Generally, the primer is applied to a dry and clean surface on the roof top substrate. The primer can include a polyurethane material; however, other types of primer can be used (e.g., asphalt-based primer; acrylic-based primer, etc.). The primer can be the same or similar material used as the binder in the sloping compound; however, this is not required. The coating thickness of the primer on the top surface of the roof top substrate is generally 0.005-0.4 inches (and all values and ranges therebetween), and typically 0.01-0.2 inches or about 50-150 sq·ft./gal.

3) Supplying and optionally preparing the mixture of sloping compound. The sloping compound is formed of at least a mixture of binder and filler material. In one non-limiting formulation, the sloping compound is formed of a filler material and binder that includes a polyurethane material. The polyurethane material can include 5-40 wt. % diisocyanate and/or polyisocyanate compound, 55-95 wt. % of one or more polyols, and 0-2 wt. % catalyst. If the polyurethane material is not premixed, then the polyurethane material should be mixed prior to adding to the filler material. The polyurethane binder (when used) can be a one- or two-part polyurethane bonder. In one non-limiting formulation, the filler material includes a first filler component and second filler component wherein the first filler component includes a rubber component (e.g., recycled ground EPDM, etc.), and the second filler component includes a polymer component (e.g., polystyrene foam beads, etc.). In one non-limiting formulation, the first filler component and second filler component have an average diameter or maximum particle dimension of 0.5-5 mm. Generally, the average size of the first filler component is greater than the size of the second filler component; however, this is not required. The volume ratio of the first filler component to the second filler component can be 2:1 to 5:1. The filler material of this non-limiting example generally constitutes 90-98 vol. % filler material and 2-10 vol. % binder. The sloping compound can be mixed together in a bucket or other type of container. As can be appreciated, the sloping compound can be supplied in a fully mixed form, thus the sloping compound is fully ready to be dispensed on the top of the roofing surface.

4) Applying and/or spreading the sloping compound on the top of the roof top substrate to reduce or eliminate recessed regions in the top of the roof top substrate and/or to create a desired sloped surface on the top of the roof top substrate. Generally, the sloping compound is applied at a maximum thickness of 10 in., and typically no more than 4 in. The minimum thickness of the sloping compound is generally at least 1 mm, and typically at least 2 mm. When a sloped surface is formed, the maximum average slope of the top surface of the sloping compound to the top surface of the roof is generally 80°, typically no more than 60°, more typically no more than 45°, and still more typically no more than 30°. During the step of applying and/or spreading the sloping compound on the top of the roof top, a user can merely shovel or pour portions of the sloping compound onto the area that requires sloping or leveling. The sloping compound can be simply spread by use of a shovel, trowel, rake, straight-edge, use of hands, and the like. After the sloping compound has been properly spread onto the roof top, the sloping compound can be optionally shaped, compressed, or stamped down. Such shaping, compression and/or stamping down process can be performed by use of a trowel, shovel, hands, or the like. When the sloping compound includes a polyurethane binder, water can be optionally applied to the trowel or other stamping device to facilitate in the shaping, stamping, and/or compressing of the sloping compound and also optionally in the curing of the binder in the sloping compound.

5) After the sloping compound is applied to the roof top, the top surface of the sloping compound can optionally be brushed to form a smoother and/or more polished top surface. The brush can be optionally wetted with water to facilitate in the brushing of the top surface of the sloping compound and also to optionally facilitate in the curing of the binder in the sloping compound.

6) Allowing the sloping compound to partially or fully cure and set. Generally, the sloping compound takes about 0.5-4 hours to achieve at least 50% curing or setting.

7) Optionally applying a coating and/or membrane on one or more portions of or all of the top surface of the sloping compound after the sloping compound has partially (at least 50% cured) or fully cured or set. The sloping compound may be porous after curing or setting, thus allowing liquid to pass through the sloping compound and/or to penetrate the sloping compound. If such porosity of the sloping compound is undesirable for a particular application, a coating and/or membrane can be applied over the surface of the sloping compound to partially or fully liquidly seal the sloping compound.

8) Optionally applying roof granules to the top surface of the sloping compound or to the top surface of the optional coating or membrane. When roof granules are optionally applied to the top surface of the sloping compound, the roof granules can be applied to the top of the sloping compound prior to the curing or setting of the sloping compound or after the curing or setting of the sloping compound. An adhesive material can optionally be applied to the top surface of the sloping compound to facilitate in adhesion of the roof granules to the top surface of the sloping compound. The adhesive material (when used) can have the same or a different composition from the binder of the sloping compound. When roof granules are optionally applied to the top surface of a membrane that has been applied to the top surface of the sloping compound, an adhesive material is generally applied to the top surface of the membrane to facilitate in adhesion of the roof granules to the top surface of the membrane. When roof granules are optionally applied to the top surface of a coating that has been applied to the top surface of the sloping compound, the roof granules can be applied to the top of the coating prior to the curing or setting of the coating or after the curing or setting of the coating. An adhesive material can optionally be applied to the top surface of the coating to facilitate in adhesion of the roof granules to the top surface of the coating. The adhesive material (when used) generally has a different composition from the coating.

In one non-limiting example, the water permeability of the sloping compound after the binder has cured, set and/or dried is less than 0.25 inch of water per square foot per hour (e.g., 0-0.24 inches of water per square foot per hour and all values and ranges therebetween.

As can be appreciated, one or more of the above steps can be used to apply the sloping compound to a ground surface, gutter, foundation wall, retaining wall, pylons, fence posts, supports posts, landscaping, playground surface, workout surface, garage floor surface, pad underneath a facet, boat deck surface, dock surface, walking regions in a landscape area, outer coating on a bumper or rail, stair top coating, etc.

Several non-limiting embodiments for use of the sloping compound in accordance with the present disclosure are illustrated in FIGS. 1-14.

Figure 2:
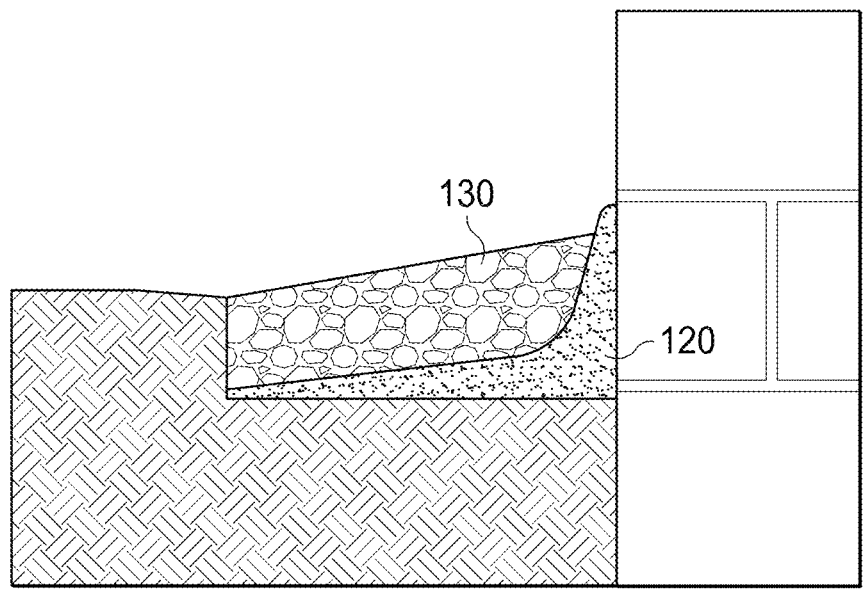
FIG. 2 is a side cross-section view of a wall and a recessed area adjacent to the wall and a sloping compound in accordance with the present disclosure located in the recessed area.

Referring new to FIGS. 1-2, there is illustrated a wall system 100 that includes a recessed region R on at least one side of the wall 110. The wall can be any type of wall (e.g., foundation wall, retaining wall, wall on a roof or other portion of a building structure, etc.). If the wall is a foundation wall or ground retaining wall, the surface G that is located about at least one outer surface of the wall represents a ground surface. If the wall is a wall on a roof, the surface G that is located about at least one outer surface of the wall represents a roof surface. As such, reference G represent the surface about at least one outer surface of the wall.

Referring to FIG. 2, the recess region R is optionally dug out and a portion or all of the recessed region is filled with the sloping compound 120. A sloped surface can be formed by the sloping compound that slopes downwardly and away from the wall 110. Generally, the maximum slop angle of the sloping compound is no more than 80°. The sloping compound can optionally bond to the surface of the wall to form a water resistant or water-proof bond between the sloping compound and the wall. The sloping compound can optionally be formulated to create a water resistant or water-proof layer. Sloping in landscaping can cause water to pool against foundation walls, causing serious water damage over time. The sloping compound can be used to bond to the wall and provide a water-proof surface to divert water away from the wall.

As illustrated in FIG. 2, stones and/or rocks or other materials can be optionally placed on at least a portion of the top surface of the sloping compound. The stones and/or rocks or other materials, when used, can be optionally secured to the sloping compound by use of a bonding agent or adhesive. Although not shown, a membrane can optionally be adhesively secured to the top surface of the sloping compound.

Figure 3:
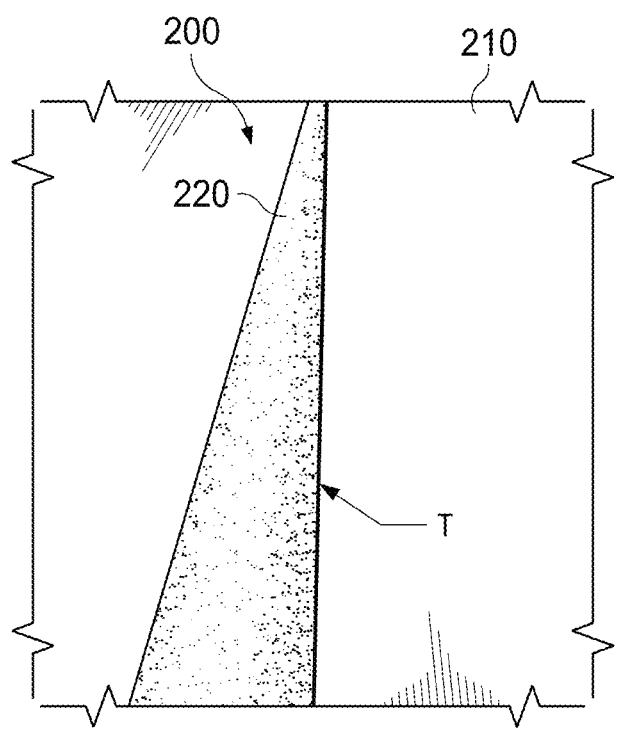
FIG. 3 is a view of a transition area between a driveway and a garage and the sloping compound in accordance with the present disclosure located in the transition area.

Referring now to FIG. 3, there is illustrated concrete pad 200 such as, but not limited to a garage floor, a transition T that is located between the concrete pad and another concrete pad 210 such as, but not limited to a driveway, and the sloping compound 220 that is located in the transition to fill the gap formed by the transition. The sloping compound can optionally be formulated to create a water resistant or water-proof layer. The sloping compound can optionally form of bond with one or both of the concrete pads. The sloping compound can be used to reduce damage to the transition from water erosion, freeze-thaw cycles, heavy forces applied to the edges of the transitions such as from vehicles moving over the transition, etc. The transition from a driveway to garage floor is can be traditionally patched with blacktop coating; however, expansion and contraction over time causes the blacktop coating to break apart. The sloping compound can be formulated to be a flexible material that resists falling apart over time.

Figure 4:
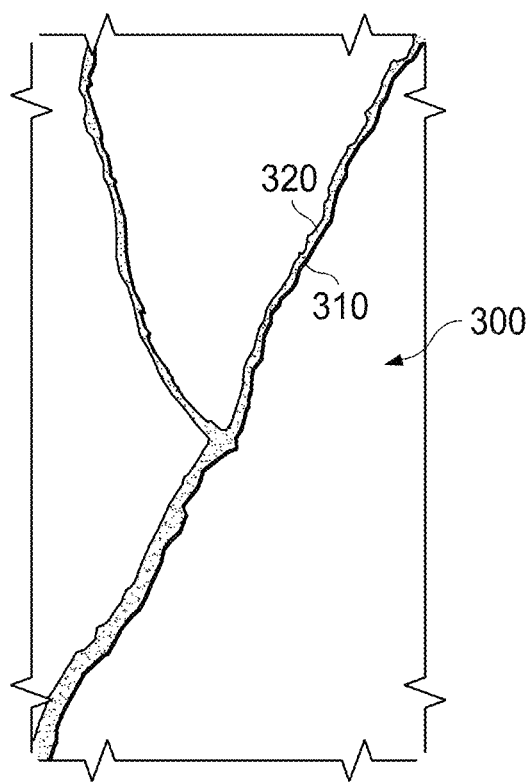
FIG. 4 is a view of a driveway and the sloping compound in accordance with the present disclosure located in the cracks in the driveway.

Referring now to FIG. 4, there is illustrated a concrete pad 300 that includes one or more cracks 310 and a sloping compound 320 inserted into the one or more cracks. The sloping compound can optionally be formulated to create a water resistant or water-proof layer. The sloping compound can optionally form of bond with the concrete pad. The sloping compound can be used to reduce further cracking and/or damage to the concrete pad from water erosion, freeze-thaw cycles, etc. Traditional driveway crack patch degrades over time and cracks. The sloping compound can be formulated creates a more durable fill that resists hardening and cracking over time.

Figure 5:
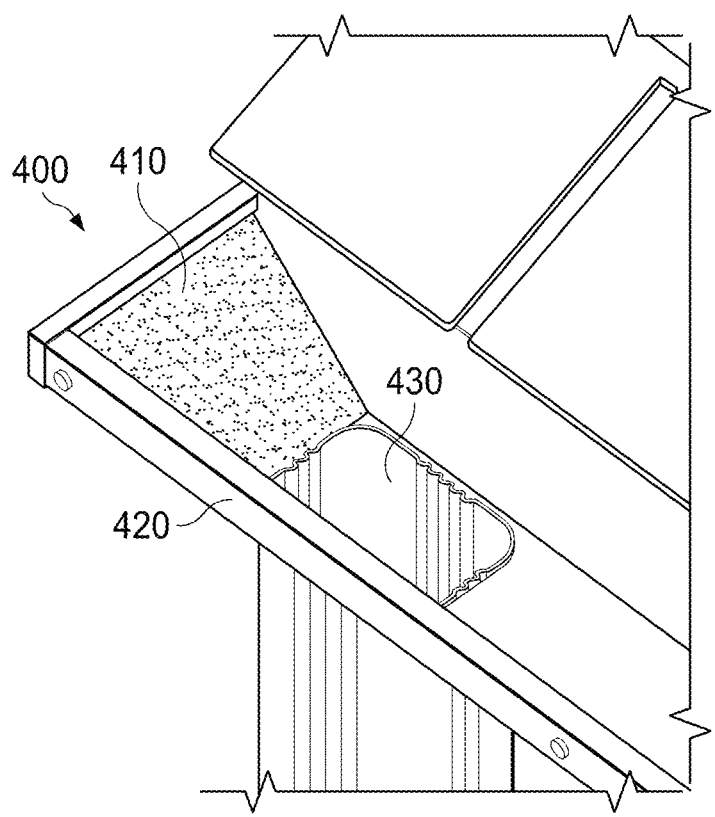
FIG. 5 is a view of a portion of a gutter and a gutter spout and the sloping compound in accordance with the present disclosure forming a sloped surface in the gutter.

Referring now to FIG. 5, there is illustrated a gutter system 400 that includes a gutter 420, a down spout opening 430 in the interior of the gutter, and a sloping compound 410 forming a sloped surface in the interior of the gutter that slopes downwardly toward the down spout opening. The sloping compound can be used to facilitate in directing water to the down spout opening and/or to reduce or eliminate dead spots in the gutter that can be prone to accumulate debris, etc. The sloping compound can optionally be formulated to create a water resistant or water-proof layer. The sloping compound can optionally form of bond with the gutter. The slope angle formed by the sloping compound is generally no more than 80°.

Figure 6:
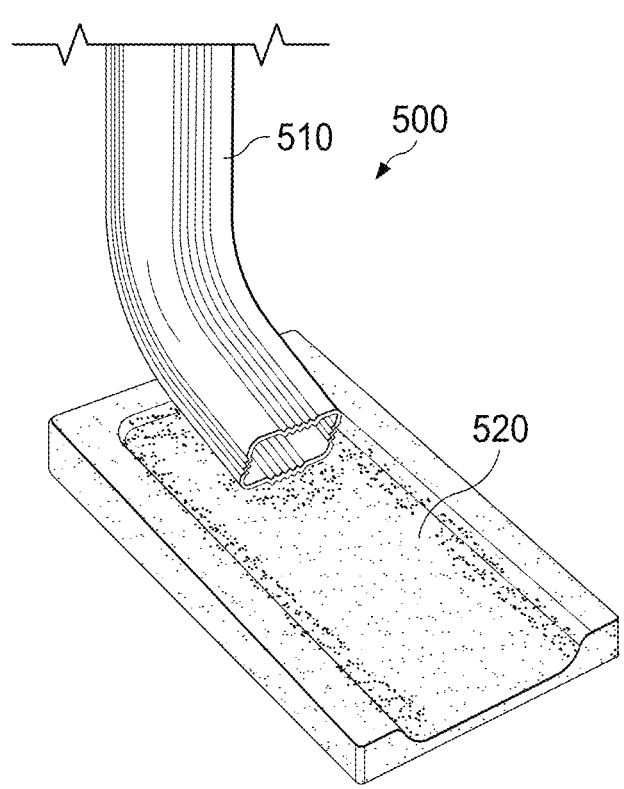
FIG. 6 is a view of the bottom portion of a down spout and a pad located under the downspout that is at least partially formed of the sloping compound in accordance with the present disclosure.

Referring not to FIG. 6, there is illustrated a bottom portion 510 of a down spout 500 and empties onto a drain pad 520 that is at least partially form of the sloping compound. The shape and size of the drain pad are non-limiting. The sloping compound can optionally be formulated to create a water resistant or water-proof layer. The drain pad can be used to inhibit or prevent water damage and/or erosion beneath the down spout opening.

Figure 7:
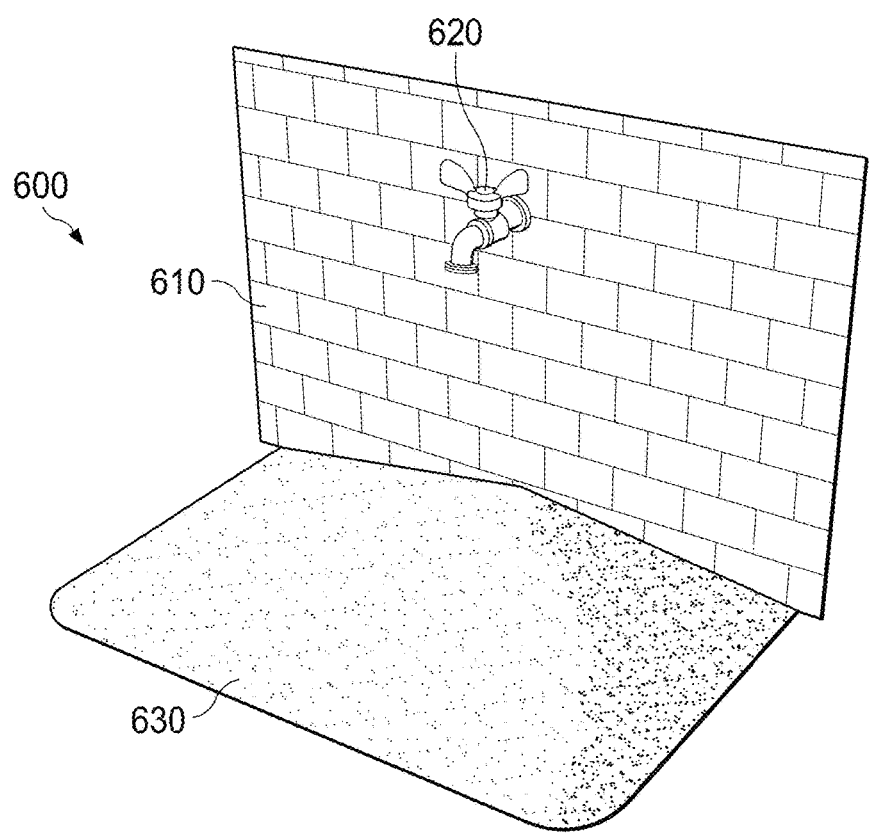
FIG. 7 is a wall that includes a faucet and a pad located under the faucet that is at least partially formed of the sloping compound in accordance with the present disclosure.

Referring now to FIG. 7, there is illustrated a wall system 600 that includes a wall 610 having a facet 620 connected to the face of the wall and a water pad 630 located under the facet, and wherein the water pad is at least partially form of the sloping compound. The shape and size of the water pad are non-limiting. The sloping compound can optionally be formulated to create a water resistant or water-proof layer. The water pad can be used to inhibit or prevent water damage and/or erosion beneath the facet and/or to form a solid and/or stable surface to stand. The water pad can be configured to shed water as far as needed and can be design to resist breaking from the wall over time. As can be appreciated, a pad formed by the sloping compound can have other uses such as, but not limited to, a floor for a home gym, a floor for a playground, a patio floor, a sidewalk, a small driveway, path surfaces, etc.

Figure 8:
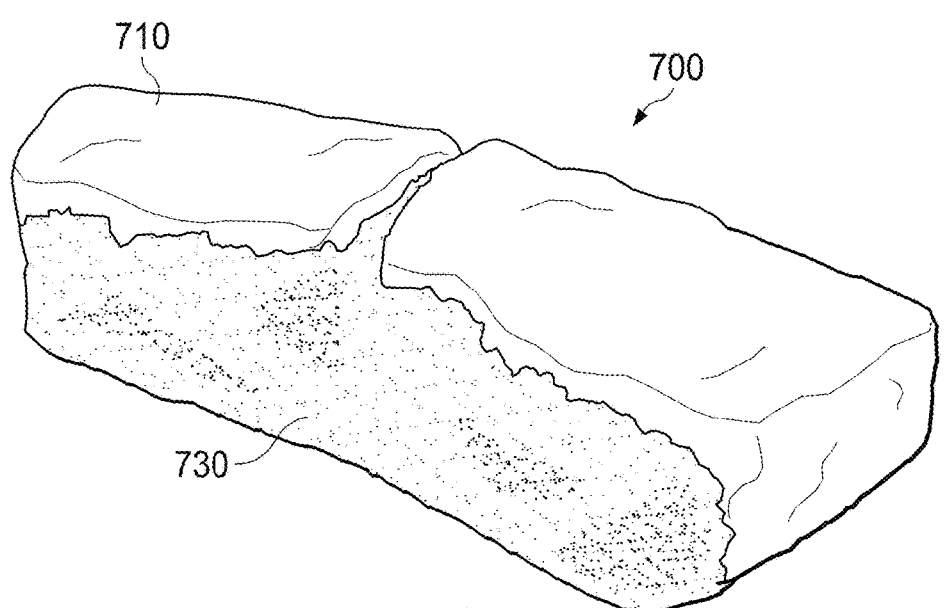
FIG. 8 is a view of two landscape stones that are connected together by the sloping compound in accordance with the present disclosure.

Referring now to FIG. 8, there is illustrated a stone block system 700 that is formed of at least two stones, blocks, pavers, etc. 710 and a sloping compound 730 that is at least partially located between the stones, blocks, pavers, etc. The sloping compound can optionally be formulated to create a water resistant or water-proof layer. The sloping compound can optionally form of bond with the stones, blocks, pavers, etc. The sloping compound can optionally be used to form a sloped surface on at least one side of the stones, blocks, pavers, etc., and wherein the slope angle formed by the sloping compound is generally no more than 80°. The sloping compound can optionally be used to facilitate in the bonding together of the stones, blocks, pavers, etc. so as to form a stronger and/or more stable structure, and/or to inhibit or prevent water damage and/or erosion between and/or beneath the stones, blocks, pavers, etc. Using the sloping compound to build a retaining wall for a garden facilitates in ensuring that the stones, blocks, pavers, etc.

will hold together, water will stay in the soil, and weeds will stay out for between the stones, blocks, pavers, etc.

Figure 9:
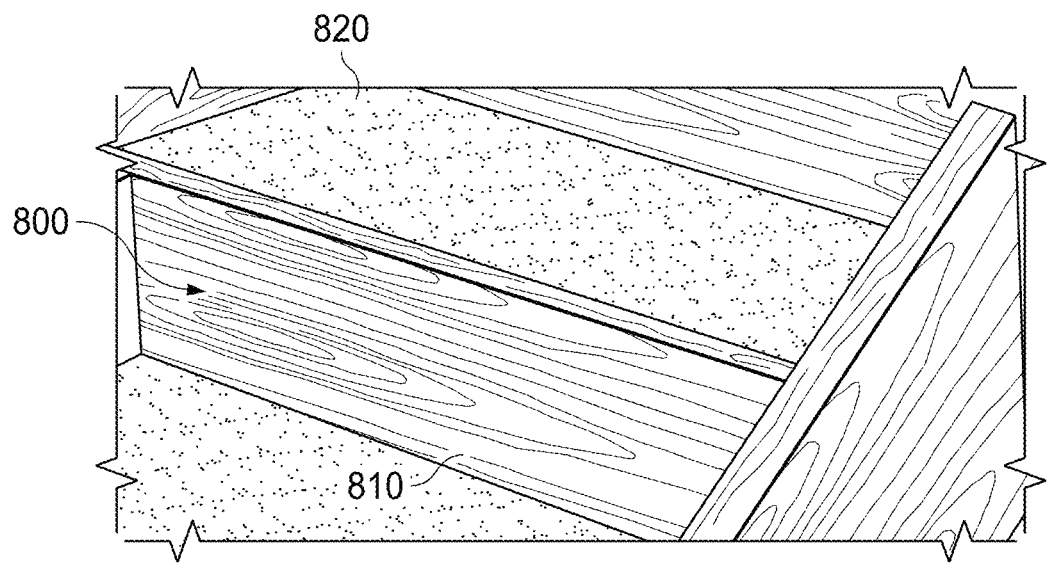
FIG. 9 is a view of two stairs on a stairway and a coating of sloping material in accordance with the present disclosure on at least a portion of the top surface of the stairs.

Referring now to FIG. 9, there is illustrated a stair system 800 and includes one or more stairs 810 and a sloping compound 820 in at least a portion of the top surface of the stair. The sloping compound can optionally be formulated to create a water resistant or water-proof layer. The sloping compound can optionally form of bond with the stair. The sloping compound can optionally form a gripping surface on the top surface of the stair and/or form a layer that protects the top surface of the stair from damage, rot, etc.

Figure 10:
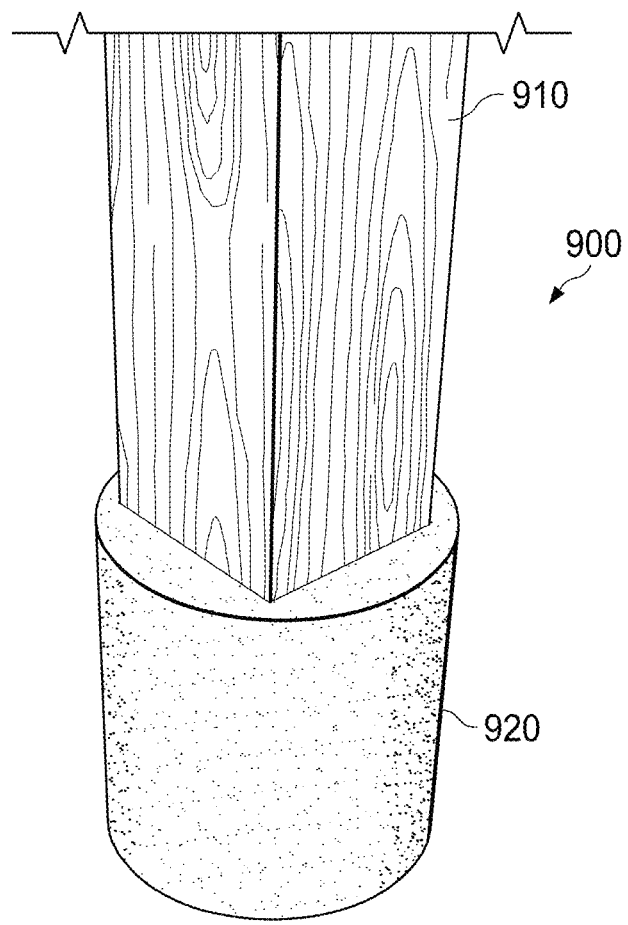
FIG. 10 is a view of a lower portion of a post that includes a coating of sloping material in accordance with the present disclosure on lower region of the post.

Referring now to FIG. 10, there is illustrated a post system 900 that includes a post 910 and a coating of the sloping compound 920 about at least a portion of the bottom portion of the post. The sloping compound can optionally be formulated to create a water resistant or water-proof layer. The sloping compound can optionally form of bond with the post. The sloping compound can optionally form a layer that protects the outer surface of the post from damage, rot, etc.

Figure 11:
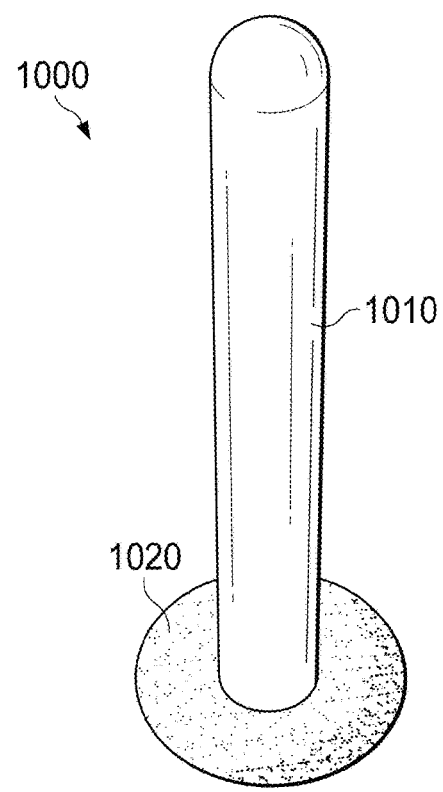
FIG. 11 is a view of a bollard that is at least partially mounted in a ground surface by the sloping compound in accordance with the present disclosure.

Referring to FIG. 11, there is illustrated a bollard system 1000 that includes a bollard 1010 that is at least partially mounted in a ground surface by the sloping compound 1020 in accordance with the present disclosure. The sloping compound can optionally be formulated to create a water resistant or water-proof layer. The sloping compound can optionally form of bond with the bollard and a foundation about the bollard. Bollards are frequently hit by vehicles, and this causes them to bend, or for the foundations to crack. A standard bollard with a foundation that is at least partially formed form the sloping compound can be used to provide a strong foundation for the bollard that will at least partially flex with impact, thereby protecting the bollard from damage.

Figure 12:
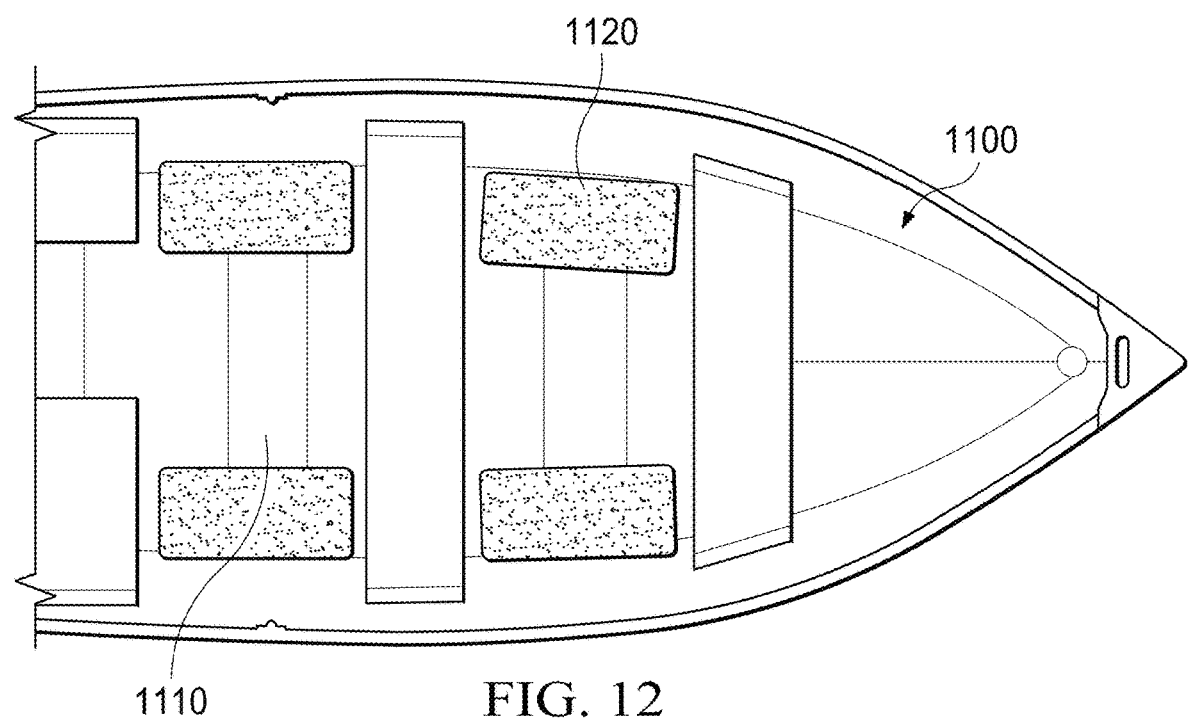
FIG. 12 is a view of a portion of a boat that includes a plurality on gripping regions in the interior of the boat that is at least partially formed of the sloping compound in accordance with the present disclosure.

Referring now to FIG. 12, there is illustrates a boat 1100 that includes an interior surface 1110 and one or more gripping surfaces 1120 that are at least partially formed form the sloping compound. The sloping compound can be used to improved traction, provide zones for loose items like gas cans, patch loose rivets and leaks, etc. The sloping compound can optionally be formulated to create a water resistant or water-proof layer. The sloping compound can optionally form of bond with the boat.

Figure 13:
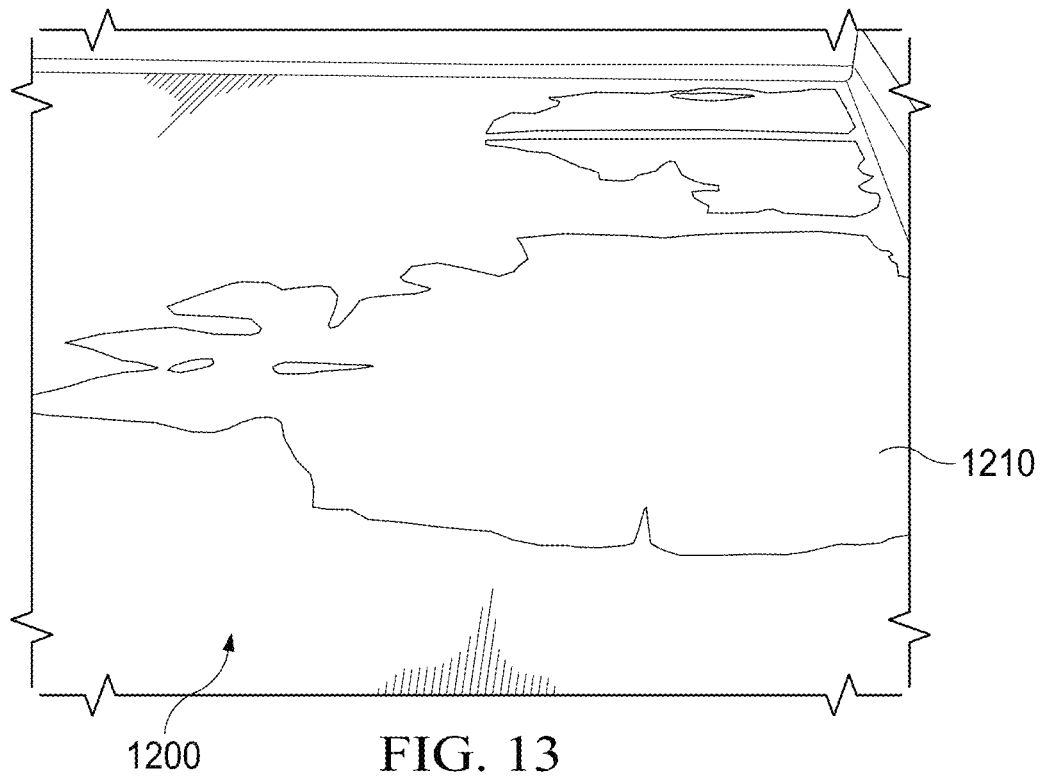
FIG. 13 is a view of a portion of a top surface of a roof that includes ponding of water; and, FIG. 14 is a view of a portion of a top surface of a roof that includes the sloping compound in accordance with the present disclosure used to eliminate lower regions on the top surface of the roof so as to inhibit or prevent the ponding of water on the top of the roof.
Figure 14:
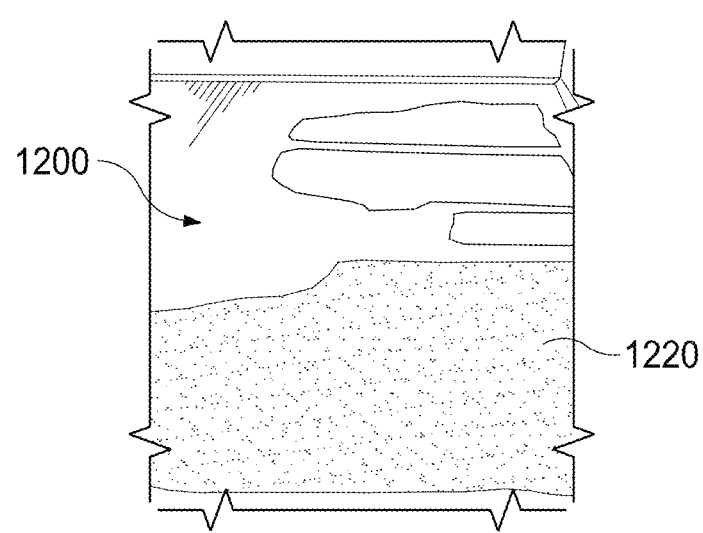

Referring now to FIGS. 13-14, there is illustrates a roof top 1200. FIG. 13 illustrates water ponding 1210 on the roof top. FIG. 14 illustrates a sloping compound 1220 applied to the roof top surface to limit or eliminate water ponding on the roof top. The sloping compound can optionally be formulated to create a water resistant or water-proof layer. The sloping compound can optionally form of bond with the roof top. The reduction or elimination of water ponding on a roof top can reduce water damage, reduce molding, reduce rotting, reduce leakage, and/or extend the life of the roof.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

What is claimed:

1. A sloping compound for use in forming a slope on low-lying regions on a roof top substrate to inhibit or prevent ponding of water on said roof top substrate and/or to create a slope on said roof top substrate to facilitate in the drainage of water on said roof top substrate; said sloping compound includes a mixture of binder and filler material; said binder includes one or more resins selected from the group consisting of epoxy resin, urethane resin, polyurethane resin, acrylic resin, styrene butadiene resin, silicone resin, vinyl ester resin, phenolic resin, polyester resin and fiberglass resin; said filler material includes first and second fillers; said first filler includes a rubber component; said second filler has a different composition from said first filler; said binder constitutes 1-20 vol. % of said sloping compound and said filler material constitutes 80-99 vol. % of the sloping compound.

2. The sloping compound as defined in claim 1, wherein said rubber component is in the form of spherical beads, non-spherical beads, tubes, rods, ground particles, and/or pellets; said rubber component includes one or more of EPDM, natural rubber, styrene-butadiene rubber, NR/SBR blends, polychloroprene, polyisoprene, and/or tire rubber.

3. The sloping compound as defined in claim 2, wherein said second filler is in the form of spherical beads, non-spherical beads, tubes, rods, ground particles, and/or pellets; said second filler includes one or more of polystyrene, PP, PE, HDPE, LDPE, PET, PBT, polyester, polyurethane, and/or acrylic.

4. The sloping compound as defined in claim 3, wherein said filler material includes a third filler; said third filler is in the form of spherical beads, non-spherical beads, tubes, rods, ground particles, and/or pellets; said third filler includes one or more of glass fibers, glass beads, glass microballoons, ceramic beads, ceramic microballoons, cork, metal, wood, kaolin clay, rock, cardboard, paper, leather, plant fibers, carbon fibers, and/or carbon tubes.

5. The sloping compound as defined in claim 1, wherein an average size of said filler material is about 0.1-20 mm.

6. The sloping compound as defined in claim 1, wherein a volume percent ratio of the rubber component to the secondary filler is 1:1 to 6:1.

7. The sloping compound as defined in claim 1, wherein a viscosity of said binder prior to curing is about 1000-6000 cP at 25° C.

8. The sloping compound as defined in claim 1, wherein said sloping compound has a permeability to water after said binder has dried, cured and/or set of less than 0.25 inches of water per square foot per hour.

9. A sloped faced foundation wall or retaining wall comprising:
a foundation wall or retaining wall extending at least partially upwardly from a ground surface; said foundation wall or retaining wall has an outer and inner surface;
a sloping surface forming a downwardly sloping surface from said inner and/or outer surface of said foundation wall or retaining wall to an outer edge of said sloping surface; said sloping surface has a maximum sloped angle of less than 80°; said sloping surface is positioned at or closely adjacent to said inner and/or outer surface of said foundation wall or retaining wall; said sloping surface is at least partially formed of a sloping compound; said sloping compound includes a mixture of binder and filler material; said binder includes one or more resins selected from the group consisting of epoxy resin, urethane resin, polyurethane resin, acrylic resin, styrene butadiene resin, silicone resin, vinyl ester resin, phenolic resin, polyester resin and fiberglass resin; said filler material includes first and second fillers; said first filler includes a rubber component; said second filler has a different composition from said first filler; said binder constitutes 1-20 vol. % of said sloping compound and said filler material constitutes 80-99 vol. % of the sloping compound.

10. A sloping system for use in I) forming a slope low-lying regions on a roof top substrate to inhibit or prevent ponding of water on said roof top substrate and/or to create a slope on said roof top substrate to facilitate in the drainage of water on said roof top substrate, or II) forming a slope adjacent to an inner surface and/or an exterior surface of a foundation wall or retaining wall to create a slope adjacent to said inner surface and/or said exterior surface of said foundation wall or retaining wall to facilitate in the drainage of water; said sloping system includes a sloping compound; said sloping compound includes a mixture of binder and filler material; said binder includes one or more resins selected from the group consisting of epoxy resin, urethane resin, polyurethane resin, acrylic resin, styrene butadiene resin, silicone resin, vinyl ester resin, phenolic resin, polyester resin and fiberglass resin; said filler material includes a first and second fillers; said first filler includes a rubber component; said second filler includes a polymer component; said second filler has a different composition from said first filler; said binder constitutes 1-20 vol. % of said sloping compound; said filler material constitutes 80-99 vol. % of said sloping compound; a volume ratio of said rubber component to said polymer component is 1.1:1 to 10:1; said sloping compound has a permeability to water after said binder has dried, cured and/or set of less than 0.25 inches of water per square foot per hour.

11. The sloping system as defined in claim 10, further including a primer positioned between said sloping compound and said foundation wall or said retaining wall; said primer is selected from the group consisting of polyurethane primer/adhesive, elastomeric primer/adhesive, silicone primer/adhesive, asphalt emulsion primer/adhesive, bitumen based primer/adhesive, acrylic primer/adhesive, butyl resin primer/adhesive, epoxy primer/adhesive, alkyd primer/adhesive, fluoropolymer primer/adhesive, polymethyl methacrylate primer/adhesive, polyester primer/adhesive, silyl terminated polyether primer/adhesive, polyurea primer/adhesive, polyurethane over polymethyl base primer/adhesive, styrene ethylene butylene styrene primer/adhesive, and styrene-acrylic primer/adhesive; a coating thickness of said primer is 0.001-0.5 inches.

12. The sloping system as defined in claim 10, wherein said binder includes a polyurethane primer/adhesive; said polyurethane primer/adhesive includes 5-40 wt. % diisocyanate and/or polyisocyanate compound, 55-95 wt. % of one or more polyols, and 0.01-2 wt. % catalyst.

13. The sloping system as defined in claim 11, wherein said binder includes a polyurethane primer/adhesive; said polyurethane material includes 5-40 wt. % diisocyanate and/or polyisocyanate primer/adhesive, 55-95 wt. % of one or more polyols, and 0.01-2 wt. % catalyst.

14. The sloping system as defined in claim 12, wherein said polyurethane primer/adhesive includes 5-20 wt. % diisocyanate and/or polyisocyanate compound, 65-95 wt. % of one or more polyols, and 0.01-2 wt. % catalyst.

15. The sloping system as defined in claim 10, wherein said polymer component includes one or more materials selected from the group consisting of polystyrene, polypropylene, polyethylene, high-density polyethylene, low-density polyethylene, polyethylene terephthalate, polybutylene terephthalate, polyester, polyurethane, and acrylic; said polymer component includes one or more shapes selected from the group consisting of spherical beads, non-spherical beads, tubes, rods, ground particles, and pellets; said polymer component has an average size of 0.1-20 mm; said rubber component includes one or more materials selected from the group consisting of ethylene propylene diene monomer rubber, natural rubber, styrene-butadiene rubber, polychloroprene rubber, polyisoprene rubber, and tire rubber; said rubber component includes one or more shapes selected from the group consisting of spherical beads, non-spherical beads, tubes, rods, ground particles, and pellets; said rubber component has an average size of 0.1-20 mm.

16. The sloping system as defined in claim 14, wherein said polymer component includes one or more materials selected from the group consisting of polystyrene, polypropylene, polyethylene, high-density polyethylene, low-density polyethylene, polyethylene terephthalate, polybutylene terephthalate, polyester, polyurethane, and acrylic; said polymer component includes one or more shapes selected from the group consisting of spherical beads, non-spherical beads, tubes, rods, ground particles, and pellets; said polymer component has an average size of 0.1-20 mm; said rubber component includes one or more materials selected from the group consisting of ethylene propylene diene monomer rubber, natural rubber, styrene-butadiene rubber, polychloroprene rubber, polyisoprene rubber, and tire rubber; said rubber component includes one or more shapes selected from the group consisting of spherical beads, non-spherical beads, tubes, rods, ground particles, and pellets; said rubber component has an average size of 0.1-20 mm.

17. The sloping system as defined in claim 10, wherein said filler material includes a third filler; a composition of said third filler is different from a composition of said first and second fillers; said third filler includes one or more materials selected from the group consisting of glass fibers, glass beads, glass microballoons, ceramic beads, ceramic microballoons, cork, metal, wood, kaolin clay, rock, cardboard, paper, leather, plant fibers, carbon fibers, and carbon tubes; said third filler includes one or more shapes selected from the group consisting of spherical beads, non-spherical beads, tubes, rods, ground particles, and pellets; said third filler has an average size of 0.1-20 mm.

18. The sloping system as defined in claim 16, wherein said filler material includes a third filler; a composition of said third filler is different from a composition of said first and second fillers; said third filler includes one or more materials selected from the group consisting of glass fibers, glass beads, glass microballoons, ceramic beads, ceramic microballoons, cork, metal, wood, kaolin clay, rock, cardboard, paper, leather, plant fibers, carbon fibers, and carbon tubes; said third filler includes one or more shapes selected from the group consisting of spherical beads, non-spherical beads, tubes, rods, ground particles, and pellets; said third filler has an average size of 0.1-20 mm.

19. The sloping system as defined in claim 10, further including a coating and/or membrane on one or more portions or all of a top surface of said sloping compound; said coating and/or membrane forms a waterproof or water resistant barrier on said top surface of said sloping compound; said coating includes one or more materials selected from the group consisting of mastic coating, elastomeric coating, silicone coating, polyurethane coating, polyurea coating, epoxy coating, reflective coating, styrene-ethylene-butylene-styrene coating, aluminized coating, solvent based asphalt coating, water based asphalt coating, roof cement, acrylic coating, and trowel grade coating.

20. The sloping system as defined in claim 18, further including a coating and/or membrane on one or more portions or all of a top surface of said sloping compound; said coating and/or membrane forms a waterproof or water resistant barrier on said top surface of said sloping compound; said coating includes one or more materials selected from the group consisting of mastic coating, elastomeric coating, silicone coating, polyurethane coating, polyurea coating, epoxy coating, reflective coating, styrene-ethylene-butylene-styrene coating, aluminized coating, solvent based asphalt coating, water based asphalt coating, roof cement, acrylic coating, and trowel grade coating.

21. The sloping system as defined in claim 10, further including a membrane that is adhesively connected to a top surface of said sloping compound; said membrane is selected from the group consisting of ethylene propylene diene monomer membrane, thermoplastic polyolefin membrane, polyvinyl chloride membrane, ketone ethylene ester membrane, modified bitumen membrane, and elastomeric film.

22. The sloping system as defined in claim 18, further including a membrane that is adhesively connected to a top surface of said sloping compound; said membrane is selected from the group consisting of ethylene propylene diene monomer membrane, thermoplastic polyolefin membrane, polyvinyl chloride membrane, ketone ethylene ester membrane, modified bitumen membrane, and elastomeric film.

23. The sloping system as defined in claim 10, further including particles of minerals, rock, and/or roofing granules that are secured to a) said top surface of said sloping compound, b) a membrane that is secured to said top surface of said sloping compound, or c) a top surface of a coating that is coated on said top surface of said sloping compound.

24. The sloping system as defined in claim 18, further including particles of minerals, rock, and/or roofing granules that are secured to a) said top surface of said sloping compound, b) a membrane that is secured to said top surface of said sloping compound, or c) a top surface of a coating that is coated on said top surface of said sloping compound.

* * * * *